United States Patent [19]

Bittner

[11] Patent Number: 5,665,403
[45] Date of Patent: Sep. 9, 1997

[54] DOUBLE TAPERED DIE MOUNT

[75] Inventor: Oszkar Bittner, Muncy, Pa.

[73] Assignee: Andritz Sprout-Bauer, Inc., Muncy, Pa.

[21] Appl. No.: 365,894

[22] Filed: Dec. 29, 1994

[51] Int. Cl.$^6$ .................................................. B29B 9/00
[52] U.S. Cl. ...................... 425/186; 425/192 R; 425/331; 425/382 R; 425/382.3
[58] Field of Search ................................. 425/183, 186, 425/191, 192 R, 308, 310, 314, 382 R, 382.3, 331, DIG. 230, 808

[56] References Cited

U.S. PATENT DOCUMENTS

| | | | |
|---|---|---|---|
| 2,798,444 | 7/1957 | Meakin | 425/331 |
| 2,908,038 | 10/1959 | Meakin | 425/331 |
| 3,551,950 | 1/1971 | Miyakawa et al. | 425/331 |
| 3,559,238 | 2/1971 | Gilman | 425/186 |
| 3,581,678 | 6/1971 | Landers | 425/331 |
| 3,981,664 | 9/1976 | Bittner et al. | |
| 4,022,563 | 5/1977 | Spencer | 425/331 |
| 4,111,632 | 9/1978 | Leaver . | |
| 4,496,298 | 1/1985 | Munch | 425/192 R |
| 4,979,887 | 12/1990 | Groebli et al. | 425/331 |
| 5,403,176 | 4/1995 | Bruckmann et al. | 425/191 |

FOREIGN PATENT DOCUMENTS

| | | | |
|---|---|---|---|
| 0043140 | 1/1982 | European Pat. Off. | 425/331 |
| 62-42815 | 2/1987 | Japan | 425/808 |

OTHER PUBLICATIONS

Andritz Sprout-Bauer, Brochure No. 5000. Dated: Jan. 1992.

Primary Examiner—Khanh P. Nguyen
Attorney, Agent, or Firm—Chilton, Alix & Van Kirk

[57] ABSTRACT

The double tapered die mount defines a channel to support the die shoulder. No contact occurs between the die and die housing. The die shoulder is machined to be in generally congruent relationship with the channel shape of the die mount of the invention. In the prior art, the die shoulder is perpendicular to both the inner radial surface and the outer radial surface of the die mount. In the preferred embodiment, the die shoulder is tapered from the inner radial surface toward the die edge to define an inner die taper. The die shoulder also tapers from the outer radial surface to the die edge to define an outer die taper. The side walls of the channel defined by the die mount of the invention taper inwardly to be congruent with tapered surfaces of the die shoulder. The inner channel wall, i.e., the channel wall closer to the axis of rotation of the die, contacts the inner die taper. The outer channel wall, i.e., the channel wall farther from the axis of rotation of the die, contacts the outer die taper. The inner channel wall and the outer channel wall taper toward each other in the direction toward the base of the channel. The edge of the die shoulder does not contact the bottom of the die mount channel, and therefore, a gap exists between the bottom of the die mount channel and the die edge. Both radial forces and torque forces resulting from operation of the pelletizer are taken up by the mated tapered surfaces.

7 Claims, 3 Drawing Sheets

DOUBLE TAPERED DIE MOUNT

BACKGROUND OF THE INVENTION

This invention relates to the field of pelletizers for food processors. In particular, this invention relates to the mounting of dies in a food pelletizer.

Pelletizers are well-known in the field of food and feed processing. A conventional pelletizer comprises a two part annular die housing supporting a cylindrical annular die. The die has a radially inner surface, a radially outer surface and annular shoulders projecting in opposite directions toward the die housing. Slots extend from the radially inner surface to the radially outer surface. Each part of the die housing supports an edge of the die. The die housing is rotatably supported from a frame. The die and die housing define an enclosed pelletizing chamber. Located within the pelletizing chamber are a series of rollers rotatably supported by a roller frame. The rollers are positioned by the frame to be in intimate contact with the radially inner surface of the annular die. The die housing is driven by a motor or other mechanism to rotate the annular die. The rollers, not being directly driven, but being in contact with the radially inner surface of the die, are caused to rotate by the rotation of the die. Conditioned feed material is introduced into the pelletizing chamber. The feed material is captured between the rollers and the radially inner surface of the die and extruded through the slots in the die. Knives or other means are located around the radially outer surface of the die to shear the extruded feed material from the radially outer surface of the die to form pellets.

In a conventional pelletizer, the die housing contacts the surfaces of the annular die shoulders and extends in a manner to form a lip in close contact with at least a portion of the outer radial surface of the die shoulder. In some designs, the die and die housing are in direct contact along the die shoulder and lip of the housing. Direct contact results in wear on both components. Reduction of wear of the components has been accomplished by hardening either or both of the die and die housing. As the components wear, they are re-machined for proper fit.

In other prior designs, a die mount is located between the radially outer surface of the die shoulder and the extended lip of the die housing. The die shoulder continues to contact the die housing. The die mount or wear, ring is employed to extend the operational life of a particular die. Vibration and flexing of the die and die housing during operation of the pelletizer results in wear of the die mount. The die mount is intended to take up the wear that would normally be experienced by the die and therefore extend the operating life of the die.

A conventional wear ring in a pelletizer is of cylindrical construction with a rectangular cross section. The longer axis of the cross sectional rectangle is parallel to an axis of rotation defined by the die mount, die and die housing. While employment of the die mount is superior to direct die to die housing contact, several disadvantages do exist from the conventional design. To preserve rotational balance, the die, die housing and wear ring must be manufactured to relatively high tolerances so as to fit well together and preserve rotational balance. The cylindrical die mount requires periodic remachining to maintain high tolerances and therefore proper balance. Even slight variations in manufacturing tolerances can result in misalignment of the components and the inability to secure the components together for operation of the pelletizer. Even during set up of correctly machined components, the large sizes of the die and die holder can easily result in misalignment of the components. Misalignment of the components produces destructive rotational imbalances during operation of the pelletizer.

SUMMARY OF THE INVENTION

Briefly stated the double tapered die mount of the present invention as an improved wear ring for supporting an annular die in a die housing of a pelletizer. The double tapered die mount defines a channel to support the die shoulder. No contact occurs between the die and die housing. The die shoulder is machined to be in generally congruent relationship with the channel shape of the die mount of the invention. In the prior art, the die shoulder is perpendicular to both the inner radial surface and the outer radial surface of the die mount. In the preferred embodiment, the die shoulder is tapered from the inner radial surface toward the die edge to define an inner die taper. The die shoulder also tapers from the outer radial surface to the die edge to define an outer die taper. The side walls of the channel defined by the die mount of the invention taper inwardly to be congruent with tapered surfaces of the die shoulder. The inner channel wall, i.e., the channel wall closer to the axis of rotation of the die, contacts the inner die taper. The outer channel wall, i.e., the channel Wall farther from the axis of rotation of the die, contacts the outer die taper. The inner channel wall and the outer channel wall taper toward each other in the direction toward the base of the channel. The edge of the die shoulder does not contact the bottom of the die mount channel, and therefore, a gap exists between the bottom of the die mount channel and the die edge.

Both radial forces, and torque forces resulting from operation of the pelletizer are taken up by the mated tapered surfaces. The mated tapered surfaces also aid in simplifying the set up assembly of the pelletizer with the die. The mated surfaces direct the die into a proper centered position, thereby decreasing the possibility of misalignment that can lead to imbalance during running of the pelletizer.

In the preferred embodiment of the invention, the die mount is located on the die holder by plugs located on the back surface of the die mount. The plugs align the die mount in the die holder and eliminate relative motion between the two. Additionally, the plugs take up shear loads from the driving force of the pelletizer and reduce shear forces on the bolts that hold the die to the die mount and die holder.

DETAILED DESCRIPTION OF THE INVENTION

Wherein like numerals represent like components throughout the figures, the double tapered die mount of the invention is generally represented by the numeral 10 throughout FIGS. 1–4.

Figure 1:
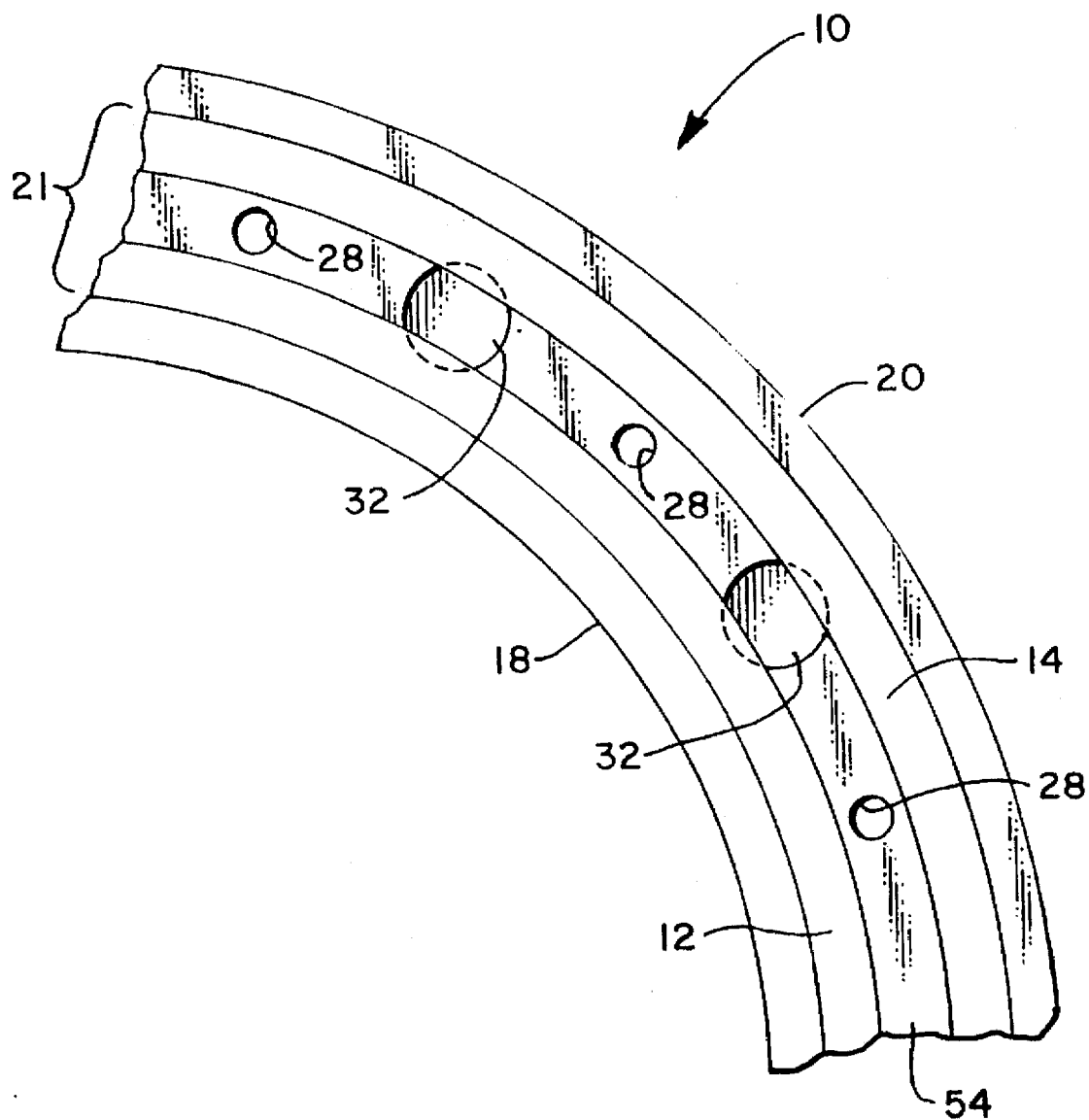
FIG. 1 is a partial plan view of a portion of the double tapered die mount in accordance with the invention.
Figure 2:
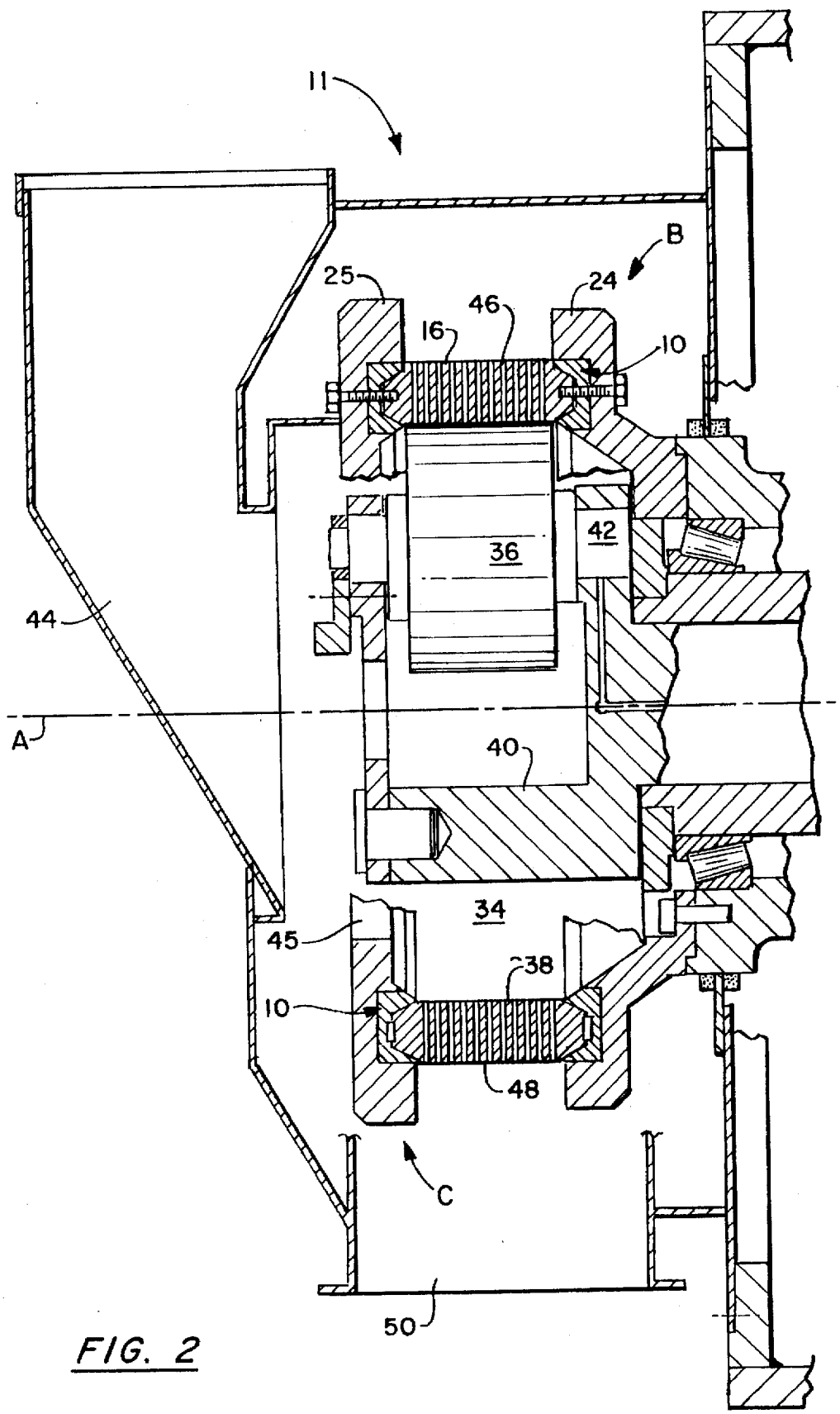
FIG. 2 is a partial cross-sectional view of the double tapered die mount of FIG. 1, installed in a pelletizing apparatus.
Figure 3:
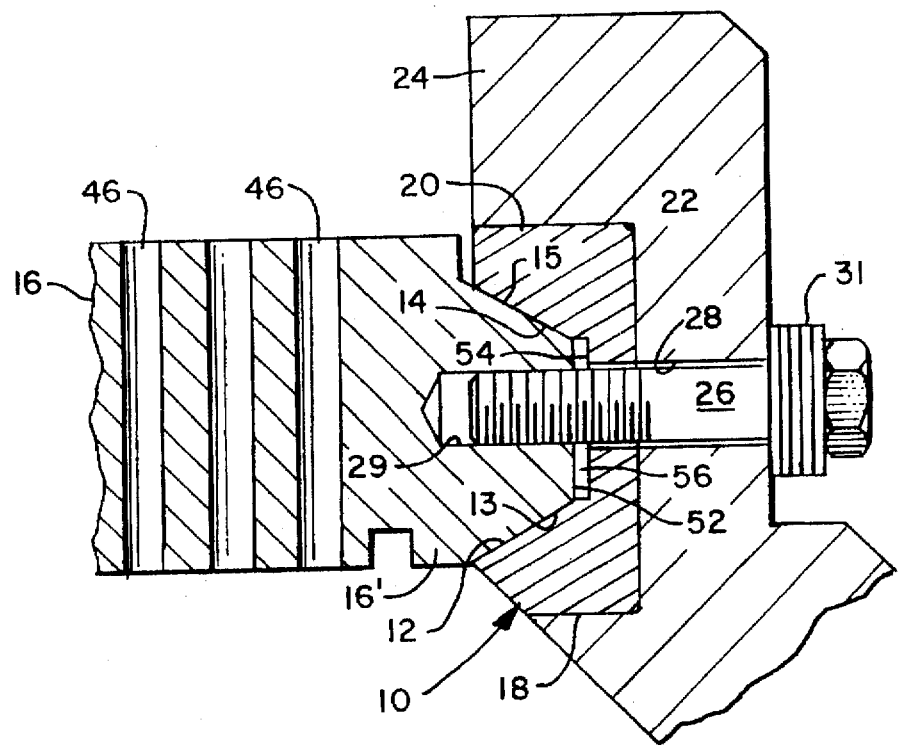
FIG. 3 is a detailed view of region B of FIG. 2.

The die mount 10 is employed in a pelletizer 11. The die mount 10 defines a slanted inner channel wall 12 and an oppositely slanted outer channel wall 14. Intermediate and continuous with the inner and outer channel walls is a channel bottom 54. The inner channel wall, outer channel wall and channel bottom define a channel 21 for receiving the annular shoulder 16' of die 16. The channel, as can be best seen from FIG. 1, is of an arcuate shape with a single center of curvature. The die mount 10 is preferably constructed as a complete ring but alternately can be constructed as ring segments in total forming a complete ring. The die further defines an inner radial surface 18 and an outer radial surface 20. Located opposite the die contact front surfaces 12, 14 is the die mount back surface 22. The inner radial surface, the outer radial surface and the die mount back surface are all supported within a groove or recess in die holders 24, 25. During operation of the pelletizer, radial forces and torque forces are taken up by the mated congruent interfaces of the inner die taper surface 13 and inner channel wall 12, and the outer die taper surface 15 and outer channel wall 14.

The die 16 is secured to the die mount and die holder by a plurality of bolts 26. Bolts 26 extend through the die holder 24, 25 and bolt passages 28 of die mount 10 and threads into a tapped hole 29 in the die shoulder 16. The bolt 26 is prevented from loosening during operation of the pelletizer 11 by the employment of cone washers 31 under the head of the bolt 26.

Figure 4:
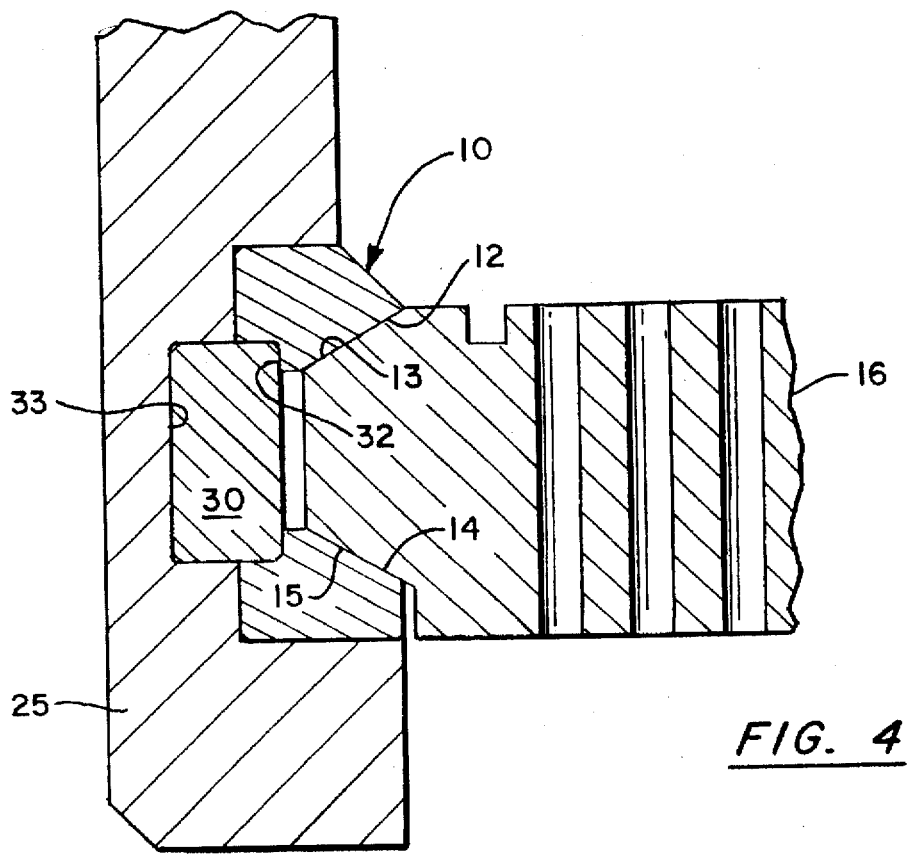
FIG. 4 is a detailed view of region C of FIG. 2.

As may best be seen in FIG. 4, the die mount 10 is positioned on the die holders 24, 25 by use of a plurality of annularly spaced apart cylindrical plugs 30. Plugs 30 closely fit into a corresponding plurality of flat bottomed counter bores (or blind bores) 32 in the die mount 10 and flat bottomed counter bores (or blind bores) 33 in the die holder 24. The plugs 30 serve not only to locate the die 10 on the die holder 24 but additionally, to take up shear loads from the driving force of the pelletizer and reduce shear forces on the bolts 26. The flat bottom holes 32 do not extend all the way through the die mount 10 but can communicate with an opening in the channel bottom 54.

The die 16 and die holders 24, 25 define an interior pelletizing chamber 34. Located within the pelletizing chamber 34 are rollers 36 in intimate contact with the radially inner surface 38 of the annular die 16. The rollers 36 are rotatably supported by the roller frame 40 against the radially inner die surface 38. The rollers 36 are not independently driven. During operation of the pelletizer 11, the roller frame 40 is supported in a fixed position within the pelletizing chamber 34. A motor or other means (not shown) rotates the die 16 and die mounts 24, 25 around an axis of rotation A. Due to the rolling friction contact of the rollers 36 on the radially inner surface 40 of the die 16, the rollers 36 rotate on bearings 42.

Conditioned feed is introduced to the pelletizer 11 at a hopper 44. The hopper 44 directs the feed through openings 45 in the die holder 25 into the pelletizing chamber 34. The feed material is captured between the rollers 36 and the radially inner surface 40 of the die 16 and extruded through slots or grooves 46 in the die 16. Located near the radially outer surface of the die 48 are knives or cutters (not shown) for shearing the extruded feed material from the die 16 to form pellets. A chute 50 collects the pellets that fall from the die 16.

The die shoulder edge 52 and the channel bottom 54 are separated by a gap 56. The gap 56 serves to take up any displacement of the die as the bolt 26 is torqued into position during setup of the die, die mount and die holder, so that the torquing of the bolts achieves tight contact only between the surfaces 15, 54 and 12, 52. The taper angles of these surfaces, are preferably substantially equal relative to the centerline of the bores 28 for receiving bolts 26. Each angle can be in the range of 15°–45°, preferably about 30°, relative to such centerline (which is parallel to the axis passing through the center of curvature of the die mount).

I claim:

1. In a pelletizer having a die mount for mounting a die, the improvement wherein said die mount comprises:

a curved member having a front and back, wherein the front includes a plurality of inwardly tapering channel walls defining a die receiving channel and a plurality of spaced apart, flat bottomed bores open on the back of the mount.

2. The pelletizer of claim 1 wherein said die mount has a flat channel bottom between and contiguous with said channel walls.

3. The pelletizer of claim 2 wherein said die mount includes a plurality of spaced apart through holes in said channel bottom.

4. A pelletizer comprising:

a frame;

a die holder rotatably mounted to said frame;

said holder defining an axis of rotation;

a curved channel shaped die mount on said holder, said mount having a center of curvature on said axis of rotation;

said mount having a plurality of inwardly slanting channel walls defining a die receiving channel;

an annular die having a plurality of tapered surfaces, said tapered surfaces in congruent contact with said channel walls; and bolt means for holding said die, said die-mount and said die holder in contact.

5. The pelletizer of claim 4, wherein said die holder defines a plurality of first locating plug holes, said mount defines a plurality of second locating plug holes opposite said first locating plug holes, and a respective plug closely fits within each of the plurality of opposed first and second locating plug holes, for taking up shear loads between the die holder and die mount as the die holder is rotated.

6. The pelletizer of claim 4 wherein said mount further defines a channel bottom between and contiguous with said channel walls;

said die defines an edge surface between and contiguous with said tapered surfaces.

7. The pelletizer of claim 6 wherein said die edge and said channel bottom define a gap.

* * * * *